(12) United States Patent
Faunce et al.

(10) Patent No.: US 6,984,138 B2
(45) Date of Patent: Jan. 10, 2006

(54) HOUSING FOR CIGARETTE LIGHTER ADAPTER OR ACCESSORY ADAPTER PLUG

(75) Inventors: Rita L. Faunce, Algonquin, IL (US); Joseph A. Laurx, Elmhurst, IL (US); Robert F. Wentink, Chicago, IL (US)

(73) Assignee: International Components Corporation, Westchester, IL (US)

( * ) Notice: Subject to any disclaimer, the term of this patent is extended or adjusted under 35 U.S.C. 154(b) by 0 days.

(21) Appl. No.: 10/833,536

(22) Filed: Apr. 28, 2004

(65) Prior Publication Data

US 2005/0090131 A1    Apr. 28, 2005

Related U.S. Application Data

(60) Provisional application No. 60/514,337, filed on Oct. 24, 2003.

(51) Int. Cl.
*H01R 13/46* (2006.01)
(52) U.S. Cl. ......................... 439/124; 439/66
(58) Field of Classification Search ............... 439/124, 439/467, 607–610, 66
See application file for complete search history.

(56) References Cited

U.S. PATENT DOCUMENTS

| | | | |
|---|---|---|---|
| 5,447,206 A * | 9/1995 | Coleman et al. | 173/170 |
| 5,670,862 A | 9/1997 | Lewyn | |
| 5,764,030 A | 6/1998 | Gaza | |
| 6,002,237 A | 12/1999 | Gaza | |
| 6,280,235 B1 * | 8/2001 | Radliff | 439/467 |
| 6,586,130 B1 | 7/2003 | Guiheen et al. | |
| 2002/0117996 A1 | 8/2002 | Cheng | |
| 2003/0221699 A1 * | 12/2003 | Battaglia et al. | 132/112 |

* cited by examiner

*Primary Examiner*—J. F. Duverne
(74) *Attorney, Agent, or Firm*—Katten Muchin Rosenman LLP; John S. Paniaguas

(57) ABSTRACT

A housing for a Cigarette Lighter Adapter (CLA) or accessory adapter plug facilitates insertion of the plug into a CLA or accessory adapter receptacle. In one embodiment of the invention, the housing is formed in a generally cylindrical shape with an expanded diameter portion defining a gripping portion which facilitates the gripping of the device. The housing may be used to house circuitry for a battery charger and include an indicator light to indicate the state of charge of the battery being charged.

5 Claims, 3 Drawing Sheets

HOUSING FOR CIGARETTE LIGHTER ADAPTER OR ACCESSORY ADAPTER PLUG

CROSS REFERENCE TO RELATED APPLICATIONS

This application is a continuation-in-part and claims priority to and the benefit of commonly owned U.S. provisional patent application No. 60/514,337, filed on Oct. 24, 2003, now abandoned.

BACKGROUND OF THE INVENTION

1. Field of the Invention

The present invention relates to a housing for a Cigarette Lighter Adapter (CLA) or accessory adapter plug housing which facilitates insertion of a CLA or accessory adapter plug into a receptacle.

2. Description of the Prior Art

Various portable devices and appliances, such as cellular phones, are known to use rechargeable batteries. For example, lithium ion batteries are known to be used in such applications. Battery chargers for such lithium ion batteries are generally known in the art. Examples of such lithium ion battery chargers are disclosed in U.S. Pat. Nos. 5,670,862; 6,586,130 and commonly owned U.S. Pat. Nos. 5,764,030 and 6,002,237. Various types of battery chargers are known. In particular both desk top and portable battery chargers are known.

U.S. published patent application US 2002/0117996A1 illustrates a desk-top type housing. Such desk top battery chargers are known to include an AC-DC converter and are configured to be plugged into a conventional 120 volt AC receptacle.

Portable battery chargers are also known and include a cigarette lighter adapter (CLA) or accessory adapter plug configured to be received in a vehicle CLA or accessory adapter receptacle. Such portable battery chargers include a DC-DC converter for converting the vehicle DC voltage to a voltage suitable for the battery to be charged.

Due to the configuration of a vehicle CLA receptacle, some CLA plugs are known to be cylindrical in shape. Such CLA plugs are also known to include a pair of oppositely disposed radial spring contacts that extent outwardly from the plug housing. These radial spring contacts are adapted to make contact with a negative contact within a CLA or accessory adapter receptacle. Depending on the spring constant of the radial spring contacts, the amount of axial force required to insert a CLA or accessory adapter plug into a receptacle will vary. It is also known that the tighter the contact between the radial spring contacts and the negative contact within the CLA or accessory adapter receptacle, the better the electrical contact. In order to provide a tight contact between the radial spring contacts and the negative contact within the plug, the spring constant of the radial spring contacts needs to be relatively high. Unfortunately, with such a configuration, the axial force required to insert the CLA or accessory adapter plug into the receptacle is relatively large causing it to be relatively difficult for an end user to insert the plug into the receptacle. The problem is exacerbated when the CLA or accessory adapter plug is formed with a relatively constant diameter cylindrical housing which does not provide a suitable gripping surface for the user. Thus, there is a need for a CLA and accessory adapter plug configuration which facilitates insertion of a CLA or accessory adapter plug into a receptacle.

SUMMARY OF THE INVENTION

The present invention relates to a housing for a cigarette lighter adapter (CLA) or accessory adapter plug that facilitates insertion of the plug into a CLA or accessory adapter receptacle. The housing in accordance with the present invention is formed in a generally cylindrical shape with an expanded diameter portion defining a gripping portion which facilitates gripping of the device. The housing may be used to house circuitry for a battery charger and include an indicator light to indicate the state of charge of the battery being charged.

DESCRIPTION OF THE DRAWINGS

These and other advantages of the present invention will be readily understood with reference to the following specification and attached drawing wherein.

DETAILED DESCRIPTION

Figure 1:
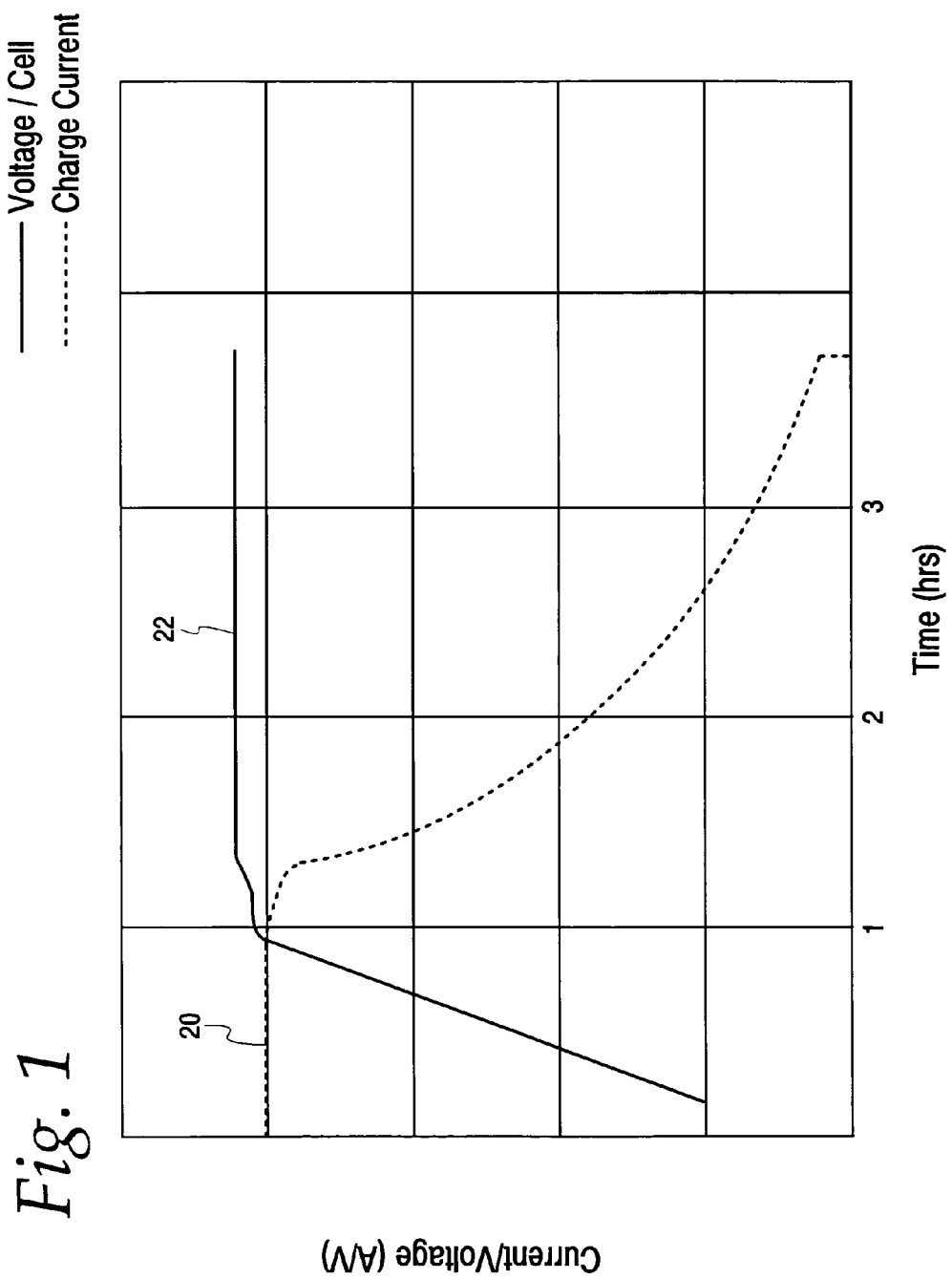
FIG. 1 is a graphical representation of the current/voltage characteristics as a function of time of an exemplary lithium ion battery.
Figure 2:
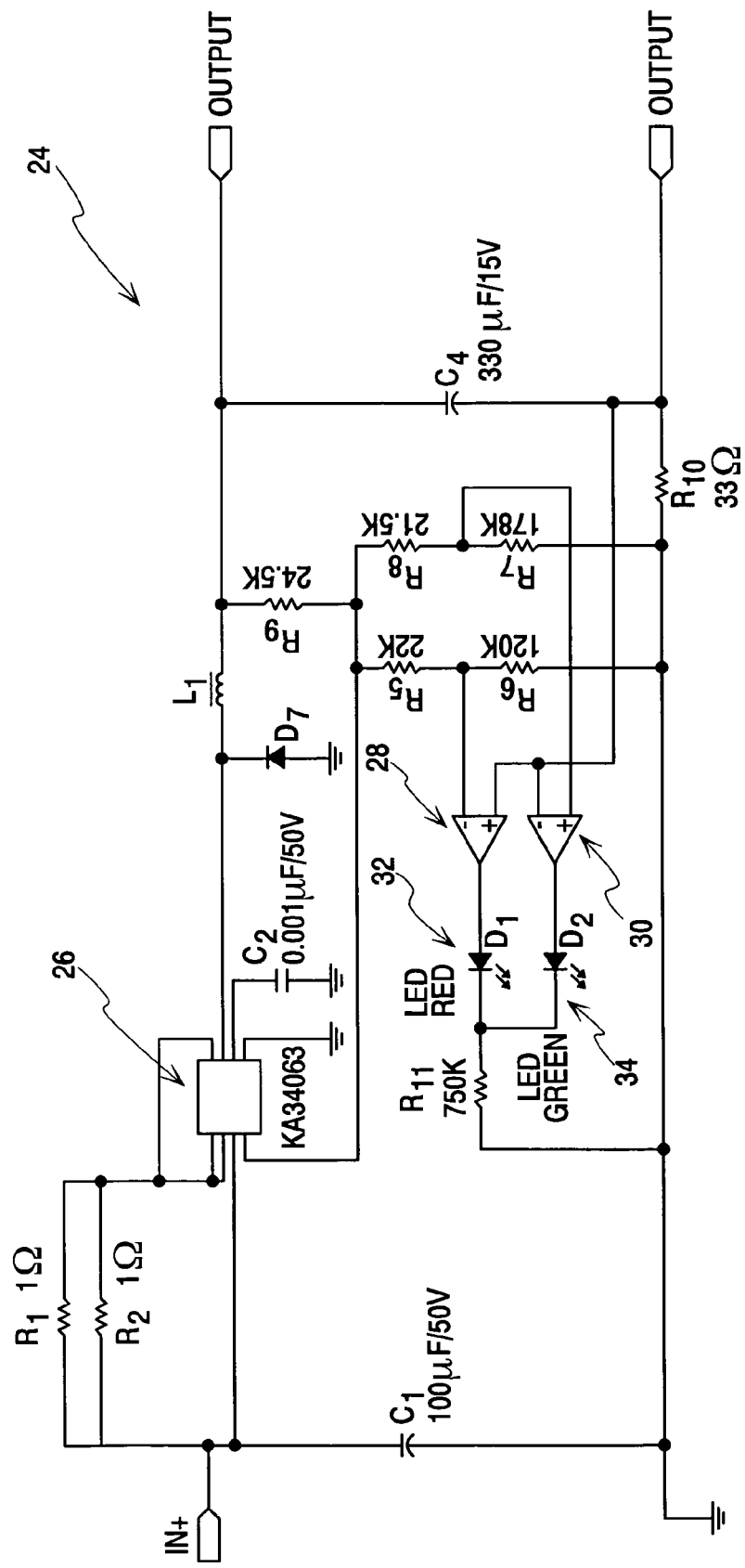
FIG. 2 is a schematic diagram of a battery charger with a visual indication system for indicating a nearly full state of charge of a lithium ion battery in accordance with the present invention.
Figure 3:
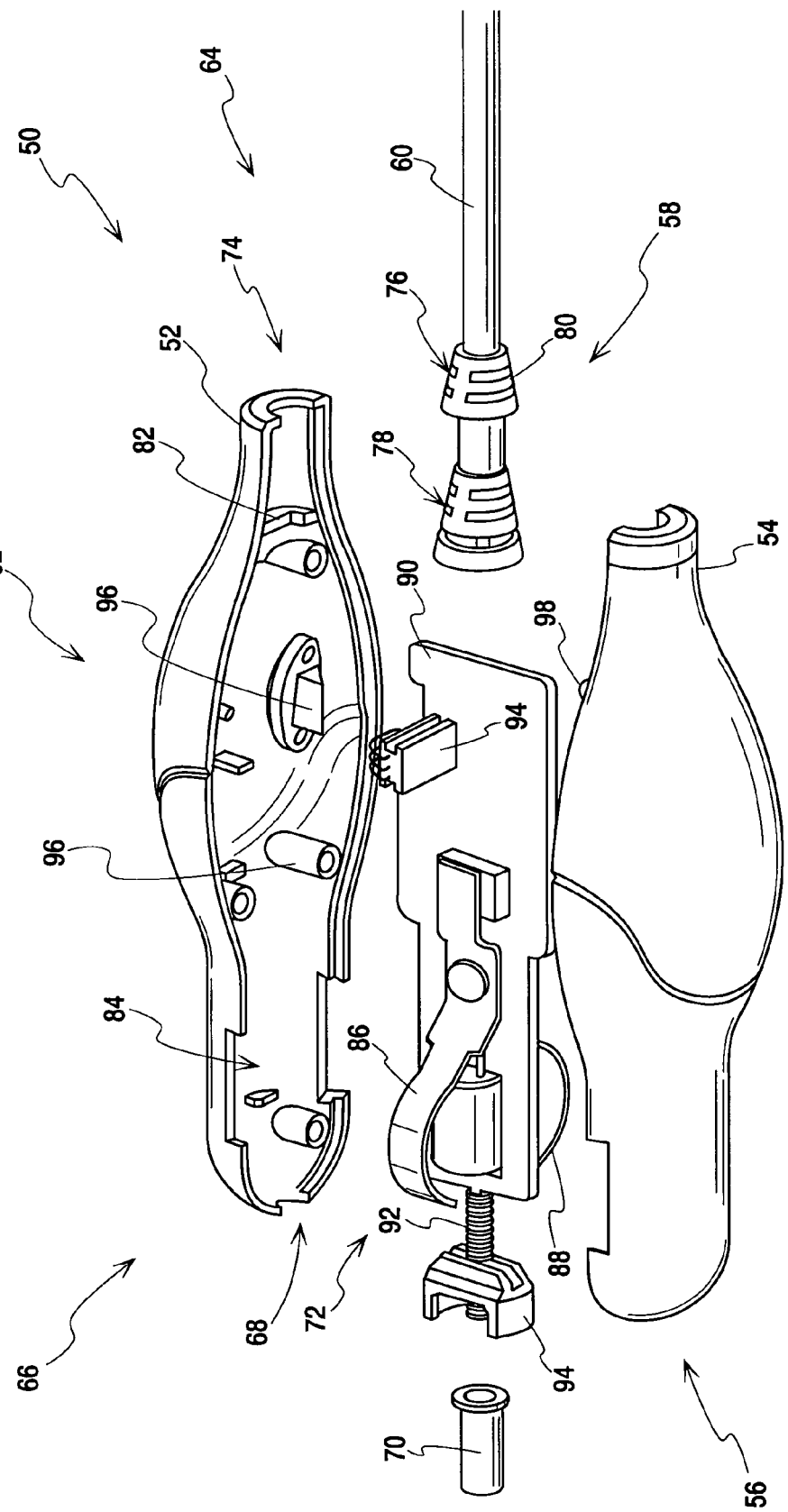
FIG. 3 is an exploded perspective view of the housing in accordance with the present invention.

The present invention relates to a housing for a cigarette lighter adapter (CLA) or accessory adapter plug that facilitates insertion of the plug into a receptacle. An exemplary diagram of the housing is illustrated in FIG. 3. In one embodiment of the invention, the housing is used to enclose a battery charger and includes a battery charge indicator light. FIG. 2 is an exemplary schematic diagram of a battery charger and battery indicator light for use with the present invention. FIG. 1 is a graphical representation of exemplary battery characteristics for use with the battery charger illustrated in FIG. 2.

Housing

The present invention relates to a housing for a CLA or accessory adapter plug that facilitates insertion of the plug into a conventional CLA or accessory adapter receptacle. An exemplary housing is illustrated in FIG. 3 and identified with the reference numeral 50. The housing 50 may optionally be formed from two (2) generally symmetrical and complementary housing halves 52 and 54 that are adapted to be secured together to form the single housing 50. These housing halves 52, 54 may be generally symmetrical relative to the axial length of the housing 50. One end 56 of the housing 50 may be used to a carry a CLA or accessory adapter plug while the opposing end 58 may be used to carry a power cord 60 for connection to a portable appliance (not shown).

An important aspect of the invention relates to the configuration of the housing 50. More particularly, each end 58, 60 of the housing 50 is formed in a generally cylindrical shape with different cross-sectional areas. In order to facilitate insertion of the plug into a receptacle, a gripping portion, generally identified with the reference numeral 62, is formed intermediate the opposing ends 58, 60. The gripping portion 62 is formed with a relatively larger cross sectional area than the cross sectional area of at least one of the opposing ends 58, 60. For example, the gripping portion 62 may be formed as an increased diameter cylindrical portion along the axial length of the housing 50 having one or more different diameters defining relatively larger cross sectional areas than at least one of the opposing ends 52, 54. The gripping portion 62 facilitates a user gripping the housing 50, which, in turn, facilitates insertion of the plug into a conventional receptacle.

Each end 64, 66 of the housing 50 includes an aperture. For example, the insertion end 64 of the housing 50 includes an aperture, generally identified with the reference numeral 68. In particular, each housing half 52, 54 may be formed with a semicircular notch, which, when assembled with the other housing half, forms the circular aperture 68. The aperture 68 is for receiving a positive contact 70 of the CLA or accessory adapter, generally identified with the reference numeral 72.

The plug end 64 is also formed with a circular aperture 74, formed from semicircular apertures in the housing halves 52, 54. The aperture 74 is configured to receive one end of the power cord 60, which may include one or more strain relief portions 76 and 78. These strain relief portions 76 and 78 may include one or more slots 80 that are adapted to receive one or more tabs 82, formed in the interior of the housing halves 52, 54 which provide strain relief of the power cord 60, preventing disconnection of the power cord 60 from the circuitry within the housing 62 as a result of axial forces on the power cord 60.

The housing halves 52, 54 may also be provided with oppositely disposed rectangular notches, generally identified with the reference numeral 84. In particular, opposing elongated notches 84 are formed in each of the housing halves 52, 54. These notches 84 are symmetrical and form an aperture that is roughly the width of a radial contact 86, 88 when the housing halves 52, 54 are joined together. Two diametrically disposed apertures are formed for receiving oppositely disposed negative contacts 86, 88 of the CLA or accessory adapter plug 72. These negative contacts 86 and 88 are rigidly secured to opposing sides of a printed circuit board (PCB) 90. The PCB 90 also carries a spring 92 and spacer 94, which form part of a positive contact assembly.

The PCB 90 also carries the circuit illustrated in FIG. 2 including one or more light emitting devices (LEDs) 32, 34 (FIG. 2) and an optional LED spacer 94. The LEDs 32 and 34 and spacer 94 are aligned with an optional light pipe 96, formed in one of the housing halves 52. The LEDs 32, 34 and the light pipe 96 may be used to provide a status indication of the state of the battery charge as discussed below. As shown, the status indicator may be located in the gripping portion 62 of the housing 50. However, other locations are also suitable.

Various methods may be used to secure the housing halves 52, 54 together. For example, molded plastic cylindrical receptacles 96 may be provided in the interior of one housing halve 52, 54 and mated with complementary molded plastic cylindrical plugs 98, formed in the interior of the other housing halve 52, 52. Various methods are known for securing the housing halves 52, 54 together. All such methods are considered to be within the broad scope of the invention.

Battery Charger

The housing illustrated in FIG. 3 in accordance with the present invention may used to carry a battery charger and an optional battery charge indicator.

A battery charger for sensing and indicating a nearly full state of charge of a battery, such as a lithium ion battery, is illustrated in FIG. 2 and generally identified with the reference numeral 24. As shown in FIG. 2, the battery charger 24 is configured as a DC-DC converter; however, the principles of the present invention are also applicable to AC-DC converters.

The battery charger is particularly useful with lithium ion batteries. Such batteries are known to take almost as long to charge the last 20% as the first 80%. The system provides an indication to the user when the battery is nearly fully charged, for example, 80% or more, utilizing a relatively simple method for sensing battery charge. As such, consumers can take advantage of this information, if desired, and avoid waiting for such batteries to be fully charged.

One embodiment of the battery charger utilizes three color indicators, indicative of three levels of charging of a battery, such as a lithium ion battery. As will be discussed in more detail below, the visual indication system may include two LEDs, which provide three colors if the LED colors are selected as primary colors. For example, red and green LEDs may be provided. In a first state, when the battery cell voltage is relatively low, a red LED is illuminated. In a second state, both the red and a green LED are illuminated to create an orange color. The orange color is used to indicate a transitional state of charge. As will be discussed in more detail below, when the battery is nearly fully charged, the red LED is turned off so that just the green LED is illuminated. The green LED is used to represent a near full state of charge. Although a three-color visual indication system is indicated, the principles of the present invention are also applicable to other visual indicators using either one, two, as well as four or more colors.

Referring to FIG. 2, a battery charger 24 which incorporates a DC-DC converter is shown connected to a cigarette lighter auxiliary (CLA) plug (not shown), as discussed above. The CLA plug mates with a complementary CLA receptacle and connects the battery charger 24 to the vehicle DC power supply, identified as IN+ and ground. A capacitor C1 may be connected between the DC power supply, IN+ and ground, to provide electromagnetic interference filtering to remove noise from the DC source at the CLA plug.

The battery charger 24 may include a power supply 26, such as a switched-mode power supply, for example, a Samsung Model KA34063 or other power supply. The switched-mode power supply 26 may be used to switch and invert the DC input into a high-frequency, for example, 40 KHz, PWM signals and to provide feedback to regulate the output voltage, based on feedback from a feedback resistor R9. As shown, the feedback resistor R9 is connected between an output terminal (OUTPUT−) of the battery charger 24 and terminal 5 of the switched-mode power supply 26. The resistor R9 forms a voltage divider with the resistors R5, R6, R7 and R8 to provide an indication of the voltage at the output terminal (OUTPUT+) of the battery charger 24. As such, switched-mode power supply 26 is able to regulate the output voltage at the output terminals OUTPUT+ and OUTPUT−.

The resistors R1 and R2 are applied to terminals 1 and 8, respectively, of the switched-mode power supply 26. These resistors R1 and R2 are current-limiting resistors and function to control the output power and current. A standard buck regulator may be coupled to terminal 5 of the switched-mode power supply 26. The buck regulator includes a diode D7 and an indictor L1. The diode D7 and indictor L1 provide DC rectification and filtering of the high-frequency switch voltage from the switched-mode power supply 26.

The frequency of the switched-mode power supply 36 is controlled by a capacitor C2. The capacitor C2 is connected between terminal 3 of the switched-mode power supply 26 and system ground. Another capacitor, C4, may be connected between the output terminals. The capacitor C4 filters the output and controls the ripple in the output signal.

The battery charger 24 may include a battery charge sensing circuit which includes a pair of operational amplifiers 28 and 30. The operational amplifiers 28 and 30 are used to drive a pair of LEDs 32 and 34, whose cathodes are tied together and connected to system ground by way of a resistor R11. The operational amplifiers 28 and 30 compare the voltage across a current sensing resistor R10 to a reference voltage at pin 5 of the switched-mode power supply 26. In particular, the voltage across the current-sensing resistor R10 is applied to an inverting input of the operational amplifier 30 and a non-inverting input of the operational amplifier 28. A voltage divider formed from the resistors R5 and R6 is applied to the inverting input of the operational amplifier 28. An output from a second voltage divider, formed from the resistors R7 and R8, is applied to the non-inverting input of the operational amplifier 30. The values of the resistors R5/R6 and R7/R8 are selected so that the LEDs 32 and 34 turn on or off as the voltage across the current sensing resistor R10 decreases below predetermined current values.

During a first charging stage, a red color, for example, may be used to indicate constant current charging until the cell voltage limit is reached. Once the cell voltage limit is reached, the charging current decreases virtually exponentially, as shown in FIG. 1. In order to indicate the transition from constant current charging, an orange color is used. The orange color is created by illuminating both the red and green LEDs at the same time. The green LED may be driven to start to turn on at a first set point, for example, 200 milliamps. As the charging continues, the charging current continues to decrease. At another set point, for example, 100 milliamps, the red LED may be biased off and the green LED kept on. The second set point may be selected at about an 80% or greater state of charge.

Obviously, many modifications and variations of the present invention are possible in light of the above teachings. Thus, it is to be understood that within the scope of the appended claims, the invention may be practiced otherwise than is specifically described above.

What is claimed and desired to be secured by a Letters Patent of the United States is:

What is claimed is:

1. A housing for a cigarette lighter adapter (CLA) or accessory adapter plug, the housing comprising:

a first housing and a second housing, said first and second housing portions being generally symmetrical with respect to a longitudinal axis of said housing and forming a generally cylindrical shape when said first housing portion and said second housing portion are assembled together defining opposing ends and an intermediate portion formed intermediate said opposing ends, said housing having a generally cylindrically cross-section defining a diameter that varies along the longitudinal axis of said housing, said intermediate portion having generally larger diameters than said opposing ends defining a compartment for receiving an electronic circuit and forming a gripping portion for gripping said housing.

2. The housing as recited in claim 1, wherein said housing defines a length and said housing halves are generally symmetrical with respect to the axial length of said housing.

3. The housing as recited in claim 1, wherein said intermediate portion includes a cross sectional area that is generally larger than the cross sectional area of both of said opposing ends.

4. The housing as recited in claim 3, wherein cross sectional area defined by said intermediate portion is generally circular.

5. The housing as recited in claim 3, wherein said cross sectional defined by said intermediate portion varies.

* * * * *